United States Patent [19]

Brooks et al.

[11] 4,101,485

[45] Jul. 18, 1978

[54] DURABLE FIRE RETARDANT FOR FOREST AND RANGELANDS

[75] Inventors: Donald L. Brooks, Manchester; Michael L. Losee, Webster Groves; Harry Teicher; Charles R. Williams, both of St. Louis, all of Mo.

[73] Assignee: Monsanto Company, St. Louis, Mo.

[21] Appl. No.: 691,179

[22] Filed: May 28, 1976

[51] Int. Cl.² .............................................. C08L 61/28
[52] U.S. Cl. ........................ 260/29.4 UA; 106/15 FP; 252/2; 252/8.1; 260/39 R; 260/851; 260/856; 260/DIG. 24
[58] Field of Search ....... 260/29.4 UA, 851, 45.9 NP, 260/45.9 R, DIG. 24, 856; 252/2, 8.1; 106/15 FP, 15, 71; 169/45

[56] References Cited

U.S. PATENT DOCUMENTS

| 3,073,805 | 1/1963 | Reinhard | 260/78.5 |
| 3,196,108 | 7/1965 | Nelson | 252/2 |
| 3,345,289 | 10/1967 | Freifeld | 252/8.1 |
| 3,562,197 | 2/1971 | Sears et al. | 260/45.9 NP |
| 3,980,140 | 9/1976 | Matsui et al. | 252/8.1 |

Primary Examiner—Theodore E. Pertilla
Attorney, Agent, or Firm—William H. Duffey

[57] ABSTRACT

A concentrated ammonium salt composition containing a binder and viscosity control agent usable in aqueous dispersion. The dispersion is applied to foliage and vegetation to hinder or prevent wildfires for one complete season.

6 Claims, No Drawings

DURABLE FIRE RETARDANT FOR FOREST AND RANGELANDS

BACKGROUND OF THE INVENTION

1. Field of the Invention

The present invention relates to a fire retardant for the protection of forest and rangelands which is durable against the effects of weather. More specifically, this invention relates to fire retarding compositions which can be applied to foliage and vegetation to hinder or prevent the occurrence of a fire rather than, as is customarily the case, being applied after a fire is underway.

2. Description of the Prior Art

Forest fires and brush fires annually cause the loss of millions of dollars worth of timber and other property. Huge damage occurs because usually by the time the fire is detected and before control measures can be applied, it is out of control in a condition known as "wildfire". Not only is the direct property loss due to such fires catastrophic, but associated soil erosion and watershed problems are also significant. It is important, therefore, to minimize and control the spread of forest fires whenever possible.

One of the simplest and best known of fire fighting techniques is to distribute water, thickened water, or water containing a chemical fire retardant over timber and other foliage (called the "fuel") in the path of a forest fire to retard advancement of the flame front. Various methods of distributing the water, including direct spraying and aerial dropping, have been employed. Aerial dropping is advantageous since areas which are not easily accessible may be thereby treated.

According to U.S. Pat. No. 3,553,128, issued Jan. 5, 1971, there are two types of fire retardants commonly employed in fighting forest, range, grass and brushland wildfires. These fire retardants are classified as "short-term" or "long-term" retardants. Short-term retardants, as defined in U.S. Pat. No. 3,553,128, rely primarily upon the water they contain to retard combustion. Long-term retardants contain, in addition to water, a water-soluble chemical that effectively retards flaming combustion for brief periods even after the water has evaporated.

At present, the most commonly used retardant chemicals are aqueous solutions of ammonium salts such as monoammonium orthophosphate, diammonium orthophosphate, ammonium sulfate and the like.

It is common practice to thicken both long-term and short-term retardants with additives in order to improve their capabilities with respect to placement or confinement on the target, adherence to the forest fuel surface, moisture barrier buildup between the fuel and flame, moisture retention, chemical retardant deposit on the fuel surface, and the like.

In the aerial application of liquid fire suppressing materials such as commonly undertaken using fixed wing aircraft, the prior art has recognized that fluids of low viscosity, when dropped from substantial elevation, tend to atomize and therefore cannot be relied upon to descend with sufficient concentration on specific target areas. It has been found that liquid fire suppressing materials having high viscosity, for example 1500 centipoises, when dropped from substantial elevations, tend to hold together such that these liquids can be confined to a specific target area and will descend thereupon with sufficient concentrations to be effective.

As pointed out in U.S. Pat. No. 3,196,108, issued July 20, 1965, most thickening agents for increasing the viscosity of fire retardant compositions are not compatible with the most effective fire suppressing chemicals available. Furthermore, it is stated therein that many of the fire suppressing chemicals which are compatible with some thickeners have such a low fire suppressing capacity that great amounts of these fire suppressing materials must be employed when used with certain compatible thickeners. It has also been found, according to U.S. Pat. No. 3,196,108, that many of the fire suppressing materials used are effective when wet but have little or no fire suppressing character when dry.

U.S. Pat. No. 3,334,045, issued Aug. 1, 1967, which discloses a fire retardant composition of the "long-term" type, points out that the maximum fire retardancy period under usual summer conditions is from about 2 to about 3 hours. The patentee concludes that it would not be feasible to prepare a fire break by aerial means much in advance of a forest fire. Having recognized the prior art limitations as of that point in time, the patentee in U.S. Pat. No. 3,334,045 disclosed a fire retardant composition said to have excellent cohesion for aerial drop application coupled with extended periods of fire retardation effectiveness. The fire retardant life, however, of the composition of U.S. Pat. No. 3,334,045 was said to be "as high as several weeks under ordinary summer conditions". This is still not sufficiently durable for extended protection.

Prior art methods and compositions for managing forest and grass fires, therefore, were largely directed to non-durable systems. Such systems and techniques were only compatible with the task of managing forest fires after the fire had started rather than attempting to prevent such fires in the first place through chemical means. Known "long-term" retardants usually become inactive following ¼ inch (0.63 cm) of precipitation, according to reports published by the U.S. Department of Agriculture Forest Service.

Furthermore, most of the rheological investigations disclosed in the literature were directed to improving flow and placement properties of compositions dropped from fixed-wing aircraft, not from helicopters or dispensed from so-called "ground tankers". Ground tankers and, to some extent, helicopters, are found to be the most desirable dispensing vehicles in the treatment of high risk, high-value foliage and vegetation.

For those prior art workers who may have considered providing a weather-durable ("semipermanent") fire retardant for foliage, the ability to produce a suitable composition at an acceptable cost was considered a major obstacle. Such a weather-durable fire retardant composition, if available, could be applied to certain high-risk, high-value forest and rangeland areas as a means of hindering or preventing wildfires rather than the customary procedure of controlling an existing wildfire.

A weather-durable fire retardant having proper economics could find immediate utility along rail and highway rights-of-way, around logging slash burn areas, campsites, power lines, etc. To be effective, compositions containing such weather-durable fire retardants should be capable of withstanding from 2 to 6 inches (5.1 to 15.2 cm) of rain, snow, fog, dew and wind. Thus, the minimum weathering requirement to be met by such a durable fire retardant is 2 inches (5.1 cm) of rainfall per fire season. The expected primary ignition sources to be encountered are small in size and transitory, e.g., matchbook incendiary devices, hot metal fragments from railroad brake shoes, flaming carbon exhaust particles, and the like.

Canadian Pat. No. 942,137, issued Feb. 19, 1974, discloses the use of a water-dispersed latex emulsion binder containing a substantially water-insoluble ammonium polyphosphate, for preventing burning of vegetation along roads, rights-of-way, in campsites and public parks. Optionally, a plasticizer is disclosed as a film-forming aid for the latex emulsion. A stated advantage of the composition of Canadian Pat. No. 942,137 is the degree of permanence achieved through water-insolubility.

U.S. Pat. No. 3,345,289, issued Oct. 3, 1967, discloses an aqueous fire retardant composition containing diammonium phosphate and a vinyl compound-maleic anhydride copolymer as a thickener. The compositions disclosed therein were intended to remain longer in place than earlier known compositions. Extended weather-durability was not embraced by the disclosure of U.S. Pat. No. 3,345,289, hence the latter patent describes fire retardant compositions useful in managing existing wildfires rather than hindering the occurrence of wildfires in the first place.

SUMMARY OF THE INVENTION

The weather-durable fire retardants of this invention, in concentrated, non-aqueous form, comprise the following components:

(a) An ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein $n$ is an integer having an average value from 20 to about 400, $m/n$ has an average value between about 0.7 and about 1.1, and $m$ has a maximum value equal to $n+2$;

(b) a reactive, water-soluble binder which insolubilizes upon drying; and (c) a water-dispersible, viscosity control agent which imparts thixotropic flow properties to an aqueous dispersion.

The principal object of the present invention is to provide a weather-durable fire retarding concentrate composition, which, when in aqueous dispersion, can be applied to grass, foliage, trees and the like before a wildfire is underway. Another object of this invention is to provide a weather-durable fire retarding composition which can be prepared in aqueous dispersion, can be conveniently and effectively applied through ground tanker spray placement, aerial placement (preferably by helicopter), or other means, and can withstand the effects of weather for the duration of one complete fire season while retaining acceptable fire retarding efficiency.

It was surprisingly discovered that the use of unusually low concentrations of the viscosity control agent in the aqueous dispersion contributed to an improved fire retarding effect and durability in the weather-durable compositions of this invention. Particularly effective viscosity control agents for use herein are cross-linked olefin-maleic anhydride interpolymers, especially ethylene-maleic anhydride interpolymers. These interpolymers impart superior thixotropic flow properties to an aqueous dispersion of the concentrate.

Another unexpected property of the viscosity control agents of this invention is their beneficial effect on required presence of the ammonium salt. For example, increased presence of the viscosity control agent permits reduction in ammonium salt requirements for the same fire retardation effect, within certain operating limits.

Still another unexpected result found herein was the "viscosity rebuilding" capability of the aqueous composition upon impact with the fuel surface. It has thus been observed that some of the customary viscosity loss encountered between initial broadcast of the aqueous dispersion and final placement on the foliage, is actually recovered after placement. This is evident from the resulting coating of the composition on the fuel and may be attributable to the thixotropic nature of the viscosity control agent. The improved coating improves fire retarding efficiency.

DESCRIPTION OF THE INVENTION AND PREFERRED EMBODIMENTS

In a preferred embodiment, a "concentrate" mixture of one or more ammonium salts, a binder and a viscosity control agent is prepared, generally in a particulated, solid form. This concentrate is sometimes referred to herein as a "concentrated ammonium salt composition" or a "particulated solid concentrate composition". Thus, the final weather-durable fire retarding composition can be manufactured by simply dispersing the concentrate in a sufficient quantity of water. Corrosion inhibitors, dyes and other well-known additives may, of course, be present in the concentrate or in the final composition.

The ammonium salt of the present compositions is selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof. Typical mixed cation salts include $NH_4MHPO_4$, $(NH_4)_2MPO_4$ and $NH_4M_2PO_4$ wherein M is an alkali metal cation, preferably sodium or potassium. Magnesium ammonium phosphate exemplifies an alkaline earth metal ammonium phosphate.

The water-insoluble ammonium polyphosphates utilized in this invention can be prepared in general by heat treating phosphates such as urea phosphate with a combined ammoniating and condensing agent such as urea or melamine. These ammonium polyphosphates are of the formula $$H_{(n-m)+2}(NH_4)_m P_n O_{3n+1}$$

wherein $n$ is an integer having an average value between 20 and about 400, $m/n$ has an average value between 0.7 and about 1.1, and $m$ has a maximum value equal to $n+2$. The physical characteristics of these ammonium polyphosphates and the various processes for preparing them are described in U.S. Pat. No. 3,397,035 dated Aug. 13, 1968. The average value of $n$ in the foregoing formula is determined by the end group titration method [Van Wazer et al., *Anal. Chem.* 26, 1755 (1954)].

The reactive, water-soluble binder employed in this invention becomes insoluble upon drying of the aqueous composition on the fuel surface. The binder is referred to as "reactive" because it reacts with itself as well as with other components of the composition.

Exemplary binding agents useful in the weather-durable fire retardant compositions of this invention are melamine resins such as trimethylol melamine. Melamine resins are particularly useful because they are readily soluble and their polymer network affords greater durability of the fuel surface coating, both physically and chemically.

Examples of other suitable substituted melamine binders include dimethylol melamine, tetramethylol melamine, pentamethylol melamine, hexamethylol melamine, mixtures of these methylol melamines, mixtures of these melamines and formaldehyde or melamine methylol melamine. Methylated guanamines and modified methylol melamines such as the trimethyl ether of trimethylol melamine are also useful.

Further examples of useful binders are dimethylol dihydroxy ureas. Suitable cyclic alkylene ureas include dimethylol ethylene urea, dimethylol propylene urea, and the like. Further examples include methylol derivatives of dicyandiamide, glyoxal reaction products of any of the above, carbamates, N-methylol derivatives, etc.

When reference is made herein to the "viscosity control agent", it is to be understood that the agent's functionality is not one of viscosity control alone. For reasons not entirely understood, superior results have been achieved through use of certain viscosity control agents which impart thixotropic flow properties to the final aqueous composition to be dispensed on the fuel, e.g., foliage, logging slash, etc. Required full-season weather durability has been achieved together with surprising retention of fire retarding efficiency on the fuel. These effects are achieved even when the absolute viscosity of the final aqueous formulation is unusually low, e.g. 20 centipoises. This points up the essential factor of rheology in placement and formation of the fire retarding composition upon the fuel surface.

While not to be construed in a limiting sense, preferred viscosity control agents for use herein are cross-linked interpolymers of $C_2$–$C_4$ olefins and maleic anhydride. Particularly effective results have been achieved with ethylene-maleic anhydride interpolymers.

Preparation of cross-linked ethylene-maleic anhydride interpolymers is described in U.S. Pat. Nos. 3,073,805 and 3,165,486. Thus, many cross-linking agents are known for use in the production of cross-linked $C_2$–$C_4$ olefin-maleic anhydride interpolymers. Vinyl esters of crotonic acid such as vinyl crotonate have found considerable utility in this regard. See U.S. Pat. No. 3,165,486.

Other viscosity control agents useful in this invention are cross-linked polyacrylic acids; certain natural and modified bentonite clays; and the like, so long as they impart the necessary thixotropic flow properties to the aqueous compositions. Guar gum, for example, did not demonstrate satisfactory performance herein.

To demonstrate the utility of the weather-durable compositions of this invention, a laboratory test procedure was devised in which rainfall was simulated. Exemplary fire retardant compositions of this invention, in aqueous dispersion, were spray-applied onto a fuel basket containing either Ponderosa pine needles or Aspen excelsior. The treated fuel basket was then dried to a constant weight and subjected to a known amount of simulated rainfall. The fuel basket was once again dried, and tested for fire retarding capability by igniting a full matchbook placed on top of the treated fuel. A complete burn or no burn response then occurs as the treated basket either ignites and burns completely for a failure, or the flaming matchbook simply burns to extinction without igniting the fuel.

The fuel baskets were constructed out of one-half inch (1.27 cm) wire mesh screen to volume dimensions of 18 inches (45.6 cm) square by three inches (7.6 cm) deep. The loaded fuel baskets were passed beneath a stationary spray system at a predetermined rate to actually effect the application. The spray system was composed of three pressurized reservoir tanks which fed a flat spray tip nozzle. The spray system was designed to provide flexibility in the rate of application, volume of application, an impingement force of the spray. By adjusting the tank pressure, height of the spray tip above the basket, and the rate at which the basket was pulled under the spray tip, an 18 inch (45.6 cm) wide spray could be obtained for various viscosity fluid dispersions that would provide the desired add-on in a single pass of the basket through the spray. Nozzle pressures between 8 and 20 psi (5,600 and 14,000 kg. per square meter) were employed for the application of all fire retardant dispersions.

The spray system was also used to simulate various amounts of rainfall. Manual movement of the spray tip over the treated basket was required to obtain even wetting.

The fuel baskets were packed with 354 grams of fuel (either cured Ponderosa pine needles or Aspen excelsior) to provide a loading equivalent to 7.5 tons (6,800 kg.) per acre. Care was taken to insure an even distribution of fuel in the basket, so as to provide as nearly as possible 972 cubic inches (15.9 liters) of fuel, with a surface area of 324 square inches (2,090 square cm.). A tared piece of aluminum foil was placed on the sides and bottom of the fuel basket to trap any fire retardant dispersion which passed through the fuel. A total gross weight of the basket, fuel, and foil was then recorded. The basket was then passed through the spray unit at a predetermined rate and pressure to effect the application. A total wet add-on was then determined by immediate weighing of the treated basket. The foil was removed and weighed to provide the weight of the solution through-put, and the basket was dried for approximately 35 minutes at 100° C. in a forced-air oven. From the total wet add-on and the dispersion through-put the calculated dry add-on was computed. The treated basket was not considered dry until the computed gross dry weight was reached.

In all cases, the fire retardant dispersions were applied within thirty minutes of preparation. Viscosity determinations were recorded for some of the fire retardant dispersions using a Brookfield LVF viscometer with a No. 4 spindle at 60 rpm. All viscosities herein are at 25° C.

The following examples illustrate the superior fire retarding performance of representative compositions of the present invention under various test conditions. In Examples I, II and III, the aforedescribed laboratory test procedure was followed.

EXAMPLE I

This example illustrates the importance of rheology to fire retardant durability of aqueous compositions of this invention. The ammonium salt was diammonium orthophosphate, present in 7.5 percent by weight of the aqueous composition. The reactive, water-soluble binder was "Resloom HP", a commercial trimethylolated melamine resin, available from Monsanto Company, also present in 7.5 percent by weight. The viscosity control agent, a cross-linked ethylene-maleic anhydride copolymer, was varied in its concentration to achieve overall viscosities of 4, 30, 65 and 100 centipoises, respectively. Because the viscosity control agent is only necessary in small amounts, these compositions each contained more than 80 percent by weight of water. The dry add-on quantity of phosphorus on the fuel was maintained constant at 1.62 grams per square foot (17.45 grams per square meter). Table I below shows the minimum viscosity of the aqueous composition which was necessary to achieve a "No Burn" response at the respective conditions of simulated rainfall.

TABLE I

| Rainfall | | Viscosity to "No Burn" |
|---|---|---|
| (Inches) | (Centimeters) | (Centipoises) |
| 0 | 0 | 4 |
| 1 | 2.54 | 30 |
| 2 | 5.08 | 65 |
| 3 | 7.62 | 100 |

EXAMPLE II

This example illustrates the presence of resin binder required to achieve a "No Burn" response following simulated rainfall at a constant phosphorus dry add-on of 17.45 grams per square meter, i.e. 17.45 grams of elemental phosphorus per square meter of planar area. In this case, the planar dimensions were 18 inches by 18 inches (45.6 cm by 45.6 cm). The ammonium salt type and concentration was the same as in Example I. The same viscosity control agent was also used, representing nominally 0.5 weight percent of the aqueous composition. The actual quantity, however, was varied sufficiently to achieve distinct viscosity levels. Table II below presents the binder levels required at varying viscosities.

TABLE II

| Rainfall | | Wt. % Binder to "No Burn" | | |
|---|---|---|---|---|
| (Inches) | (Centimeters) | 4 cps. | 65 cps. | 100 cps. |
| 0 | 0 | 5 | — | — |
| 1 | 2.54 | 11 | 5 | 5 |
| 2 | 5.08 | 12.5 | 7.5 | 6 |
| 3 | 7.62 | 15.0 | 12.5 | 7.5 |
| 4 | 10.16 | — | — | 15.0 |

EXAMPLE III

This example illustrates the ammonium salt (diammonium orthophosphate) dry add-on required to achieve a "No Burn" response for initial fire retardance at varying viscosity levels of the aqueous composition. The binder was not essential in this exercise.

TABLE III

| Viscosity (Centipoises) | Diammonium Orthophosphate (Grams per sq. meter) |
|---|---|
| 1 | 253 |
| 4 | 96 |
| 65 | 87 |
| 280 | 78 |
| 750 | 61 |

The following Examples IV, V and VI are obtained from a different laboratory test procedure although the technique was similar to that described hereinbefore. The fuel bed measured 8 feet by 1.5 feet by 3 inches deep (2.4 meters by 0.46 meters by 7.6 cm.). Aspen excelsior was again the fuel source. All fire retardant compositions, in aqueous form, were spray applied from a nozzle supported 100 centimeters above the bed at 12 psi gauge (8,430 kg. per square meter) nozzle pressure. The treated beds were dried to a constant weight at 90° F. (32° C.) prior to burning (usually 4 to 6 hours after treatment). The treated beds which were subjected to simulated rainfall were dried at least 48 hours at the above conditions to insure resin curing prior to durability testing. The simulated rain was applied at a rate equivalent to 7.4 inches (18.8 cm.) of rain per hour.

Fire retardant testing involved the ignition of the 2.4 meter fuel bed by an impinging flame front created by an untreated starter bed (36 by 18 by 3 in.; 91.5 by 46 by 7.6 cm.) of the same fuel type, which had been ignited manually. Observations were made for rate of flame spread (FS), rate of weight loss (WL), and amount of char residue remaining following complete burning. The FS was determined visually in feet per minute at 6 inch (15.2 cm.) intervals. WL was determined mechanically in grams per minute via a Statham load cell transducer instrument upon which the burning fuel bed was supported. The recorded values for both FS and WL were derived as the flame moved between the 3.0 and 7.0 foot (0.9 and 2.1 meter) intervals in an effort to reduce the initial effect of the starter bed ignition. Char residue was determined by indirect weighing following complete burning. All of the fire retardant tests were performed in a wind tunnel at 90° F. (32.2° C.) and 15 mile per hour (24.2 kilometer per hour) winds.

Three untreated control samples of Aspen excelsior were burned to establish current FS, WL and residue standards. The average of the three controls was FS = 4.54 feet per minute (1.38 meters per minute); WL = 530 grams per minute; and zero residue. The FS and WL rates obtained from the untreated controls were used to calculate "% Reductions" for each of the treated bed runs. The "% Reductions" were then used to compare against standard plots developed previously with DAP treatments at various phosphorus add-on levels. In order to have a single value for comparison of each fuel bed treatment, the % Reductions obtained for FS and WL were averaged to provide an "Average % Reduction" value, i.e. by combining FS and WL to obtain a single value.

EXAMPLE IV

Following the test procedure described above for this example, several runs at increasing rainfall were conducted on the following aqueous formulation within the present invention which has a Brookfield viscosity of 100 centipoises, all percentages being expressed by weight unless otherwise specified:

| Component | Percent |
| --- | --- |
| Ammonium polyphosphate | 3.0 |
| Diammonium phosphate | 3.0 |
| Trimethylolated melamine | 6.0 |
| Ethylene-maleic anhydride copolymer | 0.5 |
| Water | 87.5 |

Results are presented in Table IV below:

TABLE IV

| Rainfall (cm.) | P Add-on (gm/m²) | % Reduction | | | Δ Avg. % | Total Δ % |
| --- | --- | --- | --- | --- | --- | --- |
| | | FS | WL | Avg. | | |
| 0 | 15.1 | 78 | 63 | 71 | — | — |
| 1.27 | 16.2 | 72 | 63 | 68 | −3 | — |
| 2.54 | 15.1 | 61 | 56 | 59 | −9 | — |
| 5.08 | 15.1 | 68 | 56 | 62 | +3 | −9 |

EXAMPLE V

Following the same procedure as in Example IV, the following formulation, which also had a Brookfield viscosity of 100 centipoises, was evaluated:

| Component | Percent |
| --- | --- |
| Diammonium phosphate | 7.5 |
| Trimethylolated melamine | 7.5 |
| Ethylene-maleic anhydride copolymer | 0.5 |
| Water | 84.5 |

Results are presented in Table V below:

TABLE V

| Rainfall (cm.) | P Add-on (gm/m²) | % Reduction | | | Δ Avg. % | Total Δ % |
| --- | --- | --- | --- | --- | --- | --- |
| | | FS | WL | Avg. | | |
| 0 | 16.2 | 81 | 69 | 75 | — | — |
| 1.27 | 16.2 | 69 | 63 | 66 | −9 | — |
| 2.54 | 16.2 | 6 | 51 | 28 | −38 | — |
| 5.08 | 16.2 | 21 | 48 | 35 | +7 | −40 |

EXAMPLE VI

This example employed the procedure and approximate formulation of Example V. Viscosity of the aqueous composition was varied to demonstrate its important effect on durable fire retardance. The following data were obtained at a simulated rainfall of 2 inches (5.08 cm.).

TABLE VI

| Run No. | Viscosity (Centipoises) | P Add-on gm/sq. meter | % Reduction | | | Total Δ % Avg. |
| --- | --- | --- | --- | --- | --- | --- |
| | | | FS | WL | Avg. | |
| 1 | 4 | 17.25 | 11 | 17 | 14 | 61 |
| 2 | 100 | 16.15 | 21 | 48 | 35 | 40 |
| 3 | 1,000 | 17.25 | 41 | 60 | 51 | 24 |

The concentrated ammonium salt compositions of this invention can be prepared according to numerous convenient procedures, including simply blending or mixing together appropriate amounts of the respective dry ingredients. A flow conditioner can be advantageously incorporated within the dry concentrate to facilitate handling and transfer.

Other additives such as corrosion inhibitors and coloring agents may be conveniently incorporated into the dry concentrate.

Concentration of the ammonium salt (or salt mixture) within the particulated solid concentrate composition may vary within broad limits depending upon the particular application involved. Thus, the ammonium salt (or mixture of such salts) will usually comprise from about 20 percent to about 70 percent by weight of the essential components of the dry concentrate. Preferably, the ammonium salt comprises from about 30 percent to about 60 percent by weight of said concentrate, i.e. the combined weight of binder, viscosity control agent and ammonium salt (or salt mixture).

Weight concentration of the water-soluble binder in the particulated solid concentrate compositions of this invention is often about the same as that of the ammonium salt (or mixture of ammonium salts). It is to be understood, however, that the binder concentration may be allowed to vary as dictated by the conditions of application and weather exposure on the fuel. Typically, the binder comprises from about 20 to about 70 percent by weight of the dry concentrate, usually about 30 to 60 percent.

Weight concentration of the viscosity control agent within the dry concentrate can be comparatively low while still permitting the ultimate achievement of durable fire retardance. Successful results are obtained with about 1 to about 10, preferably 2 to 6, percent by weight of viscosity control agent in the concentrated ammonium salt composition. Higher or lower amounts may be desirable for various applications, depending to some extent on the specific agents employed. Thus, the ethylene-maleic anhydride copolymer may be effective when present in as little as 0.5 percent by weight of the dry concentrate.

When preparing the concentrated ammonium salt compositions for dispensing from ground tankers or helicopters, large amounts of water are employed such that the concentrate then represents only a minor portion of the aqueous dispersion, e.g. about 5 to about 40 percent by weight, often about 10 to 20 percent. Maximum presence of the soluble ammonium salt (or salt mixture) is governed in part by saturation limits. Typically, the ammonium salt (or salt mixture) will constitute about 2 to 20 percent by weight of the aqueous dispersion, preferably about 3 to 10 percent. Binder presence is approximately the same as that of the ammonium salt.

Presence of the viscosity control agent within the aqueous dispersion can vary, for example, from about 0.1 to 5 percent by weight, preferably from about 0.2 to about 1.5 percent.

While this invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. A concentrated ammonium salt composition suitable for use in the manufacture of aqueous weather-durable fire retardants which comprises:
(a) From about 20 to 70 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein $n$ is an integer having an average value from 20 to about 400, $m/n$ has an average value between about 0.7 and about 1.1, and $m$ has a maximum value equal to $n+2$;
(b) from about 20 to 70 percent by weight of a reactive, water-soluble binder which insolubilizes upon drying; and
(c) from about 1 to 10 percent by weight of a water-dispersible, viscosity control agent which imparts thixotropic flow properties to an aqueous dispersion of said composition.

2. A concentrated ammonium salt composition suitable for use in the manufacture of aqueous weather-durable fire retardants which comprises:
(a) From about 30 to 60 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein $n$ is an integer having an average value from 20 to about 400, $m/n$ has an averge value between about 0.7 and about 1.1, and $m$ has a maximum value equal to $n+2$;
(b) from about 30 to 60 percent by weight of a melamine resin binder; and
(c) from about 2 to 6 percent by weight of a crosslinked olefin-maleic anhydride interpolymer.

3. A composition of claim 2 wherein the ammonium salt is diammonium orthophosphate, ammonium polyphosphate, or a mixture thereof, and the interpolymer is ethylene-maleic anhydride.

4. A weather-durable fire retardant composition which comprises an aqueous dispersion of
(a) An ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein $n$ is an integer having an average value from 20 to about 400, $m/n$ has an average value between about 0.7 and about 1.1, and $m$ has a maximum value equal to $n+2$.
(b) a reactive, water-soluble binder which insolubilizes upon drying; and
(c) a water-dispersible, viscosity control agent which imparts thixotropic flow properties to an aqueous dispersion,
wherein (a), (b) and (c) together comprise from about 5 to 40 percent by weight of said aqueous dispersion.

5. An aqueous weather-durable fire retardant composition which comprises:
(a) From about 2 to 20 percent by weight of an ammonium salt selected from the group consisting of monoammonium orthophosphate, diammonium orthophosphate, monoammonium-alkali metal mixed orthophosphates, diammonium-alkali metal mixed orthophosphates, ammonium-alkaline earth metal mixed orthophosphates, ammonium sulfate, substantially water-insoluble ammonium polyphosphates, and mixtures thereof, wherein said ammonium polyphosphates are represented by the formula $$H_{(n-m)+2}(NH_4)_m P_n O_{3n+1}$$

wherein $n$ is an integer having an average value from 20 to about 400, $m/n$ has an average value between about 0.7 and about 1.1, and $m$ has a maximum value equal to $n+2$;
(b) from about 2 to 20 percent by weight of a reactive, water-soluble binder which insolubilizes upon drying; and
(c) from about 0.1 to 5 percent by weight of a water-dispersible viscosity control agent which imparts thixotropic flow properties to said composition.

6. An aqueous composition of claim 5 wherein the ammonium salt is diammonium orthophosphate, ammonium polyphosphate, or a mixture thereof; the binder is a melamine resin; and the viscosity control agent is a cross-linked $C_2$–$C_4$ olefin-maleic anhydride interpolymer.

* * * * *